(12) United States Patent
Mizugaki

(10) Patent No.: US 11,778,512 B2
(45) Date of Patent: Oct. 3, 2023

(54) WIRELESS MANAGEMENT SYSTEM AND WIRELESS MANAGEMENT METHOD

(71) Applicant: Hitachi, Ltd., Tokyo (JP)

(72) Inventor: Kenichi Mizugaki, Tokyo (JP)

(73) Assignee: HITACHI, LTD., Tokyo (JP)

( * ) Notice: Subject to any disclaimer, the term of this patent is extended or adjusted under 35 U.S.C. 154(b) by 39 days.

(21) Appl. No.: 17/672,881

(22) Filed: Feb. 16, 2022

(65) Prior Publication Data

US 2022/0322149 A1 Oct. 6, 2022

(30) Foreign Application Priority Data

Mar. 30, 2021 (JP) ................................ 2021-057844

(51) Int. Cl.
*H04W 28/20* (2009.01)
*H04W 28/22* (2009.01)
*H04W 72/52* (2023.01)
*H04W 72/543* (2023.01)

(52) U.S. Cl.
CPC .......... *H04W 28/20* (2013.01); *H04W 28/22* (2013.01); *H04W 72/52* (2023.01); *H04W 72/543* (2023.01)

(58) Field of Classification Search
CPC ... H04W 56/005; H04W 56/00; H04W 24/02; H04W 28/18; H04W 28/20; H04W 28/22; H04W 72/52; H04W 72/543; H04W 72/04; G01S 13/003; G01S 13/765; G01S 13/767; G01S 13/87; G01S 13/00; G01S 13/76; G01S 5/02; H04L 43/0864
See application file for complete search history.

(56) References Cited

U.S. PATENT DOCUMENTS

| | | | |
|---|---|---|---|
| 10,237,775 B1* | 3/2019 | Kokkinen | H04W 4/021 |
| 2015/0339748 A1* | 11/2015 | Huo | H04M 15/805 705/26.44 |
| 2016/0316416 A1* | 10/2016 | Raval | H04W 48/02 |
| 2017/0041817 A1* | 2/2017 | Shomura | H04W 28/0268 |
| 2021/0297880 A1* | 9/2021 | Kuwahara | H04L 43/10 |
| 2022/0053338 A1* | 2/2022 | Nekoui | H04W 16/14 |
| 2022/0101725 A1* | 3/2022 | Kobayashi | G08G 1/16 |
| 2022/0108262 A1* | 4/2022 | Cella | G06Q 10/063118 |
| 2022/0116752 A1* | 4/2022 | Gupta | H04W 48/16 |
| 2022/0159441 A1* | 5/2022 | Aminaka | H04L 65/80 |
| 2022/0159560 A1* | 5/2022 | Yanai | H04W 48/18 |
| 2022/0167248 A1* | 5/2022 | Yanai | H04W 28/08 |
| 2022/0272594 A1* | 8/2022 | Anderson | H04L 41/0663 |

FOREIGN PATENT DOCUMENTS

| | | | | |
|---|---|---|---|---|
| JP | 2015-126407 A | | 7/2015 | |
| WO | WO-2019097113 A1 | * | 5/2019 | ............ H04W 16/14 |

* cited by examiner

*Primary Examiner* — Nathan S Taylor
(74) *Attorney, Agent, or Firm* — Baker Botts L.L.P.

(57) ABSTRACT

A wireless management system manages a wireless system including a base station and terminals. The wireless management system includes a computer that includes an arithmetic device that executes predetermined arithmetic processing, and a storage device connected to the arithmetic device. The arithmetic device calculates a usage rate of radio resources used by the terminal based on positional information of the terminals and the number of terminals communicating with the base station at the time of communication between the terminals and the base station.

9 Claims, 11 Drawing Sheets

WIRELESS MANAGEMENT SYSTEM AND WIRELESS MANAGEMENT METHOD

CLAIM OF PRIORITY

The present application claims priority from Japanese patent application JP 2021-057844 filed on Mar. 30, 2021, the content of which is hereby incorporated by reference into this application.

BACKGROUND OF THE INVENTION

1. Field of the Invention

The present invention relates to a wireless management system.

2. Description of the Related Art

A terminal used in public communication of the related art is a smartphone or the like carried by a user, and there are characteristics that the terminal moves with the user and various communications are performed with one terminal.

However, in recent years, self-employed communication using a technology of public communication such as Local 5G and Private LTE has begun to spread. These communication methods have advantages that communication quality can be guaranteed and higher security can be realized than wireless communication methods such as a wireless LAN that have been used in the related art. One example of a usage method that takes advantages is wireless transmission of control signals of devices at production sites such as factories and data acquired by sensors. In such a usage pattern, the terminals are fixedly installed, and one terminal transmits and receives a limited kind of data.

A usage status of radio resources is important as an operational management index for a wireless system. The amount of radio resources corresponds to the amount of data with which the wireless system can simultaneously communicate. Thus, when the number of terminals that simultaneously communicate with increases, or when each terminal communicates with a large size of data, the radio resources allocated to each terminal become tight, and thus, a communication failure occurs.

In the public communication of the related art, the communication carrier monitors the usage status of the radio resources at each base station, and takes measures such as a case where base stations are added to an area where resource shortages occur constantly. As a method for grasping the usage status of the radio resources, there is a method for acquiring system parameters of the base station.

As a background art of this technical field, there is the following related art. JP 2015-126407 A describes a wireless network evaluation device that includes a signal-to-interference noise ratio estimation unit that estimates a signal-to-interference noise ratio at a site by using wireless quality independent of a wireless load at the site and a wireless load of a cell covering the site, a simultaneous connection number estimation unit that estimates the number of simultaneously connected people corresponding to the wireless load, and a communication speed estimation unit that estimates a communication speed at the site by using throughput corresponding to the estimated signal-to-interference noise ratio and the estimated number of simultaneously connected people, and an estimation result of the communication speed corresponding to at least one time characteristic of the wireless load, the signal-to-interference noise ratio, and the number of simultaneously connected people is output chronological order from the communication speed estimation unit (see claim 1). The method described in JP 2015-126407 A is a method that can be used only on the communication carrier side where information from the base station is obtained, and information on a position of a user terminal and a type of communication that are not obtained on the carrier side is not used.

SUMMARY OF THE INVENTION

In a self-employed communication network such as Local 5G and Private LTE, a 5G or LTE system equivalent to a public network is used. Since the public network is operated by a communication carrier with high technical skills and a lot of experience in operation control of the network, a stable network operation can be performed. On the other hand, in the self-employed network, the user basically operates the network by himself or herself or an external contractor who is entrusted to operate the network. In this case, since the knowledge and skills of network operation are less than the communication carrier, stable operation and troubleshooting of the network may be insufficient.

On the other hand, the self-employed network has characteristics different from the public network, such as a case where a position of the terminal is fixed and the amount of communication data to be generated and a timing of communication are fixed, as in the case of use in the factory mentioned above.

However, an operation management system for realizing a network operation that can be intuitively understood by the user by utilizing such characteristics has not been realized. Specifically, there is no wireless management system that exhibits a margin of radio resources in a current system by grasping a status of radio resources by using information obtained on the user side.

An installable location of the terminal cannot be presented to an administrator from throughput and a communication schedule required by the terminal.

Throughput estimated by the terminal cannot be presented to the administrator from the installation position and the communication schedule of the terminal.

A typical example of the invention disclosed in the present application is as follows. That is, there is provided a wireless management system that manages a wireless system including a base station and terminals. The wireless management system includes a computer that includes an arithmetic device that executes predetermined arithmetic processing, and a storage device connected to the arithmetic device. The arithmetic device calculates a usage rate of radio resources used by the terminal based on positional information of the terminals and the number of terminals communicating with the base station at the time of communication between the terminals and the base station.

According to one aspect of the present invention, it is possible to show a margin of radio resources. Other objects, configurations, and effects will be made apparent in the following descriptions of the embodiments.

DESCRIPTION OF THE PREFERRED EMBODIMENTS

First Embodiment

Figure 1:
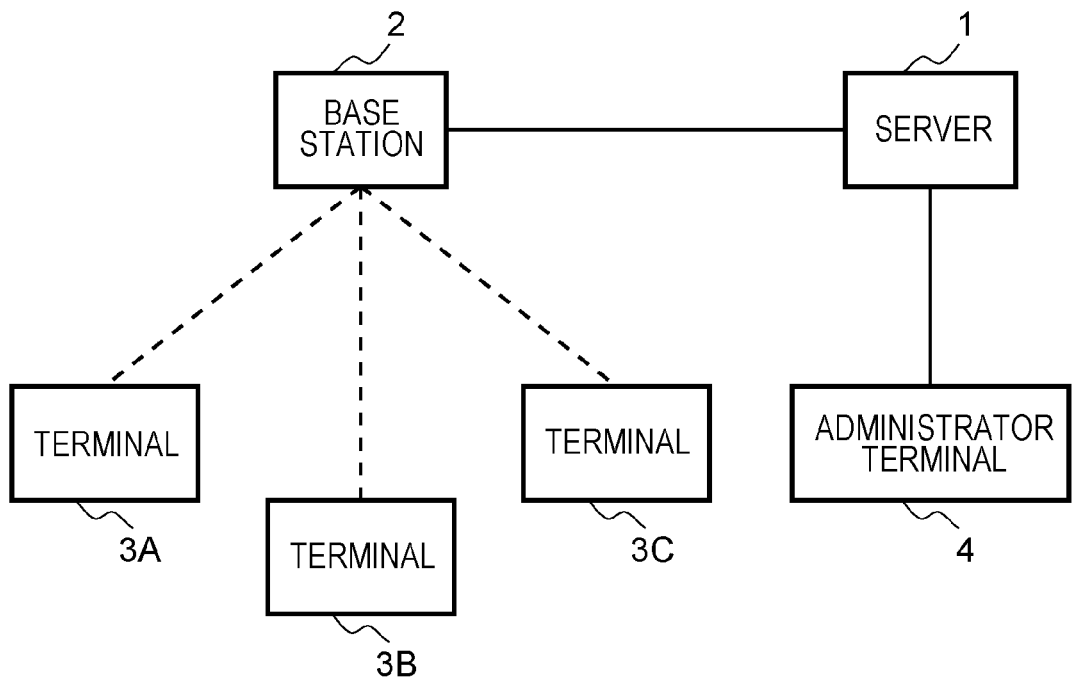
FIG. 1 is a diagram illustrating a configuration of a wireless management system according to an embodiment of the present invention.

FIG. 1 is a diagram illustrating a configuration of a wireless management system according to an embodiment of the present invention.

The wireless management system according to the present embodiment includes terminals 3 that are connected to a device such as a sensor or a surveillance camera and wirelessly transmit data from the device, a base station 2 that wirelessly communicates with a plurality of terminals 3, a server 1 that receives information from the terminal 3 and information from an administrator and manages a radio resource usage status of the system, and an administrator terminal 4 that is used to input and output information by a network administrator. The network administrator operates the administrator terminal 4 and registers information required to manage an operation of the system in the server 1. The server 1 provides information required to manage a network to a system administrator through the administrator terminal 4.

Figure 2:
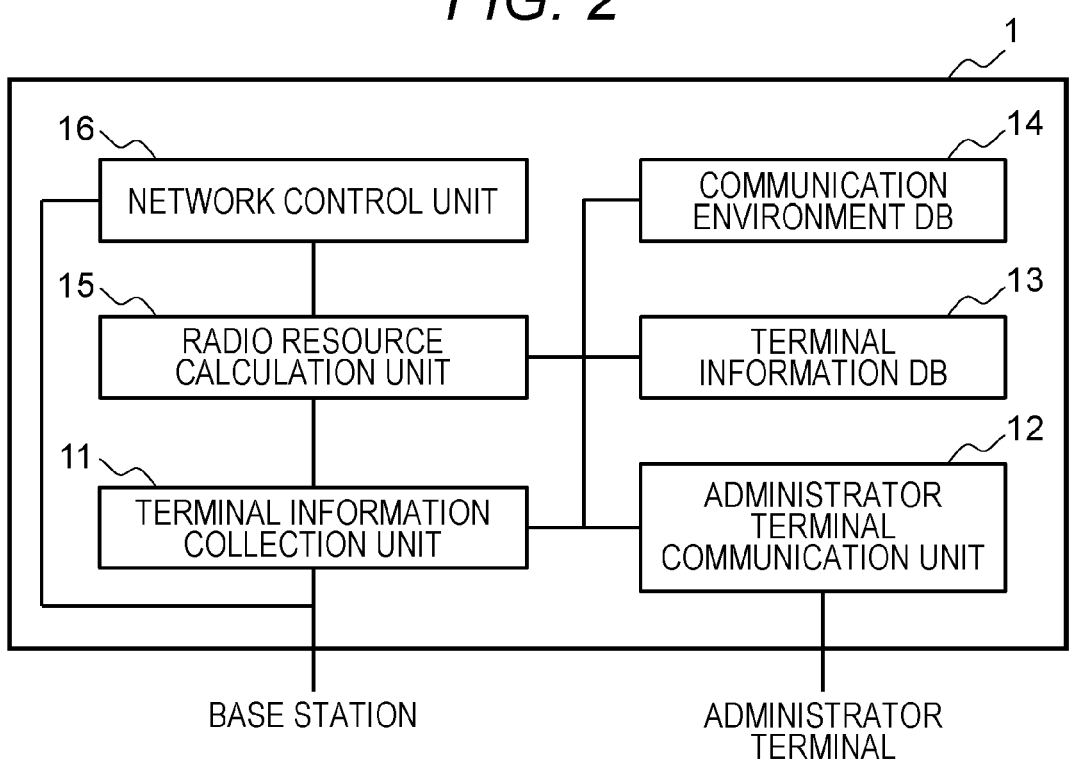
FIG. 2 is a functional block diagram of a server according to the present embodiment.

FIG. 2 is a functional block diagram of the server 1.

The server 1 includes a terminal information collection unit 11, an administrator terminal communication unit 12, a terminal information database 13, a communication environment database 14, a radio resource calculation unit 15, and a network control unit 16. The terminal information collection unit 11 communicates with the terminal 3 through the base station 2 and collects the information of the terminal 3. The administrator terminal communication unit 12 receives required information such as terminal positional information from the administrator through the administrator terminal 4, and provides the information required to manage the network to the administrator through the administrator terminal 4. The terminal information database 13 stores the acquired information on the terminal 3 (for example, a position of the terminal 3, throughput, or the like). The communication environment database 14 stores a signal strength distribution in a communication area and correspondence information between throughput and signal strength. The radio resource calculation unit 15 calculates a usage status of the radio resource by using the acquired information. The network control unit 16 controls a network by using the calculated radio resource usage status. For example, the network control unit 16 may allocate a large number of radio resources to a preset priority terminal, or may limit the allocation of radio resources to the terminal 3 having low throughput.

Figure 3:
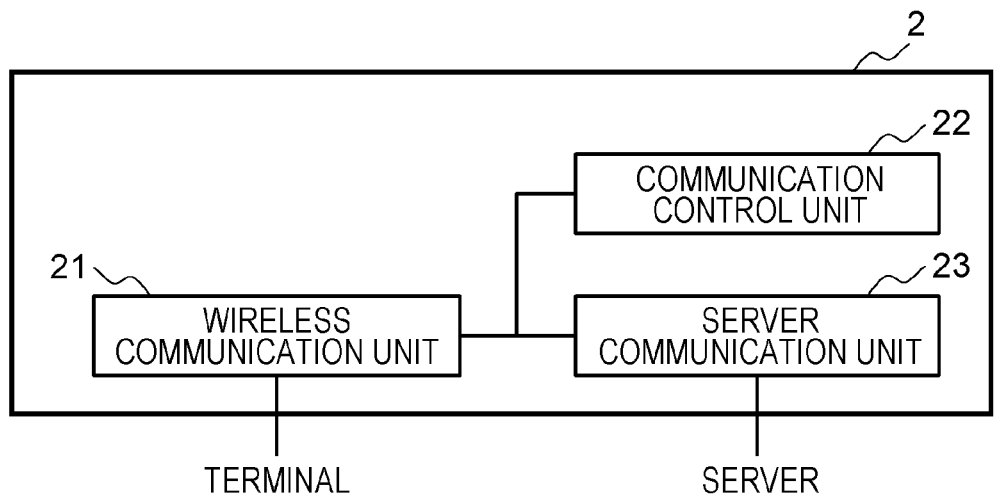
FIG. 3 is a functional block diagram of a base station according to the present embodiment.

FIG. 3 is a functional block diagram of the base station 2.

The base station 2 includes a wireless communication unit 21, a communication control unit 22, and a server communication unit 23, sends, to the server 1, information required to manage the radio resources transmitted from the terminal 3, and controls a timing of wireless communication with the terminal 3 according to an instruction from the server 1. The wireless communication unit 21 communicates wirelessly with the terminal 3. The communication control unit 22 controls wireless communication with the terminal 3. The server communication unit 23 communicates with the server 1.

Figure 4:
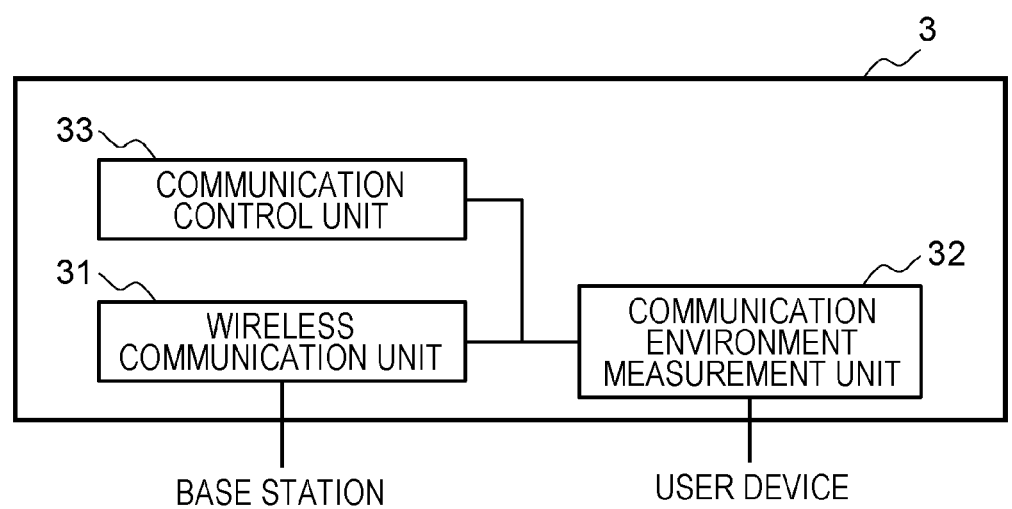
FIG. 4 is a functional block diagram of a terminal according to the present embodiment.

FIG. 4 is a functional block diagram of the terminal 3.

The terminal 3 includes a wireless communication unit 31, a communication environment measurement unit 32, and a communication control unit 33. The terminal 3 is connected to a user device such as a sensor or a robot, and wirelessly transmits and receives information input and output to and from the user device. The terminal 3 measures received signal strength and throughput of a signal from the base station 2 according to an instruction from the server 1 or autonomously, and transmits a measurement result to the server 1 through the base station 2. Timings at which information is transmitted and received from the user device are controlled according to an instruction from the server 1. The wireless communication unit 31 wirelessly communicates with the base station 2. The communication environment measurement unit 32 measures the received signal strength and the throughput of the signal from the base station 2. The communication control unit 33 controls a timing of wireless communication according to an instruction from the server 1.

Figure 5:
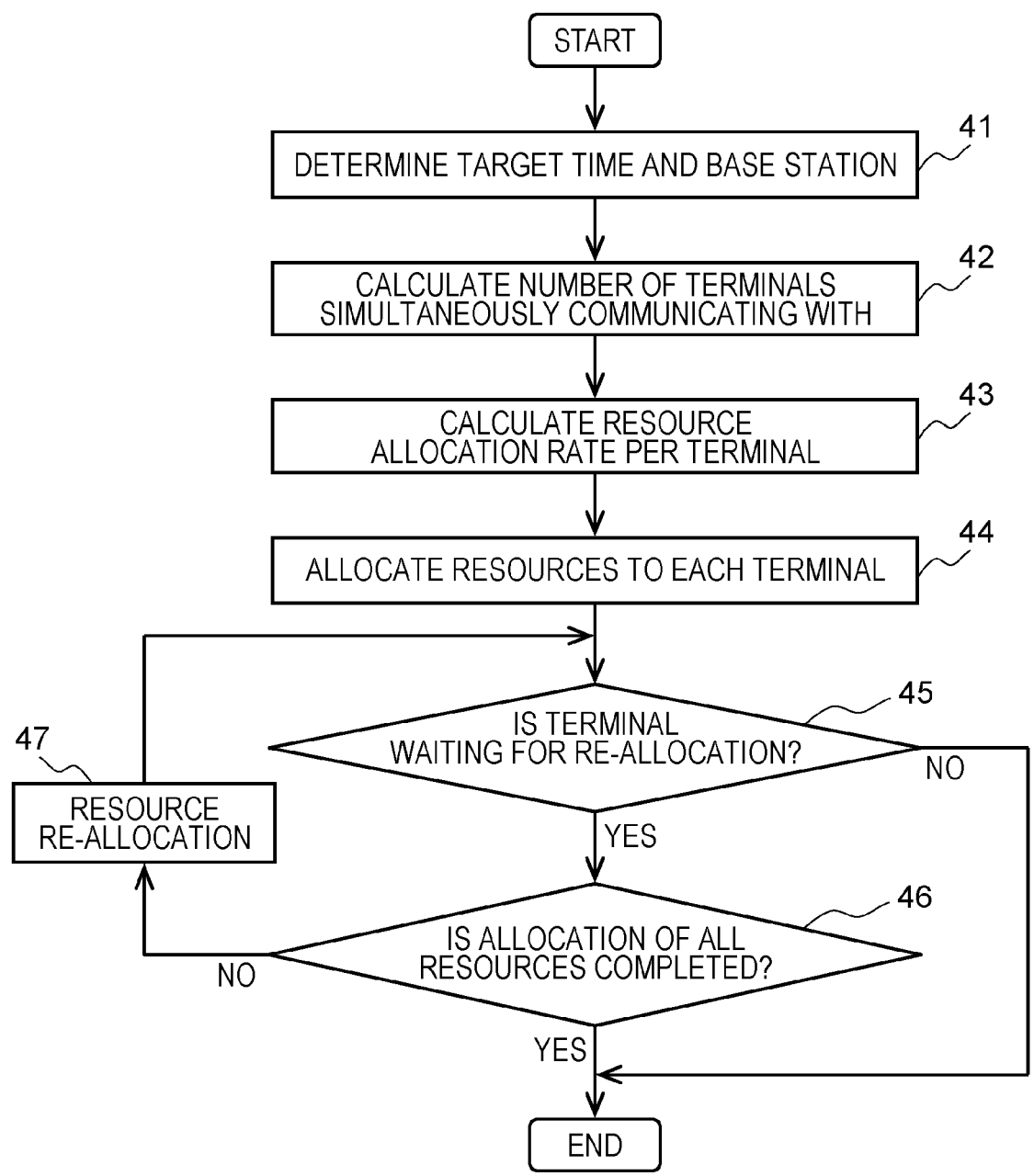
FIG. 5 is a flowchart of estimation processing according to a first embodiment.

FIG. 5 is a flowchart of estimation processing of estimating a radio resource usage rate of the terminal 3 in the wireless management system.

The usage rate estimation of the radio resources is executed by the radio resource calculation unit 15 of the server 1. Since the radio resources are allocated to the terminals 3 connected to the base station 2 for each base station 2, when the radio resource usage rate is calculated, first, a time at which the usage rate is calculated and the base station 2 that calculates the usage rate are determined (41).

Subsequently, the number of terminals 3 communicating with the base station 2 at this time is calculated (42). For example, the number of terminals 3 communicating with is calculated while referring to communication schedules of the terminals 3. The communication schedules are a communication time, a communication interval, a communication period, and the like of each terminal 3 input by the administrator, and a timing at which the terminal 3 is communicating with is managed by these pieces of information. The wireless management system may estimate the terminal 3 with a high communication possibility at a certain time in the future based on past information by recording a communication time and the amount of communication of the terminal 3 in the past, and may use an estimated value of the number of terminals 3 with the high communication possibility as the number of terminals simultaneously communicating with. The management system may specify devices, such as a machine tool, a sensor, and a camera that are operating at a certain time in the future, to which the terminal 3 is connected, and may use, as the number of terminals simultaneously communicating with, the total number of devices that can perform steady communication among from the specified devices.

Subsequently, the wireless management system calculates a radio resource allocation rate of the terminal 3 (43). When all the radio resources of the base station 2 are set to 1, the radio resource allocation rate is a rate of the radio resources allocated to each terminal 3. For example, when the base station 2 allocates, to one terminal, 30% of the radio resources to be allocated, the radio resource allocation rate of the terminal is 0.3. When the number of terminals simultaneously communicating with is n and the radio resources are equally allocated to the connected terminals 3, the radio resource allocation rate of each terminal 3 is 1/n.

Subsequently, the radio resources are allocated to the terminals 3 according to the radio resource allocation rate calculated in step 43 (44). The details of an allocation procedure will be described with reference to FIG. 6. After the radio resources are allocated, the terminal 3 that cannot satisfy the required throughput with the allocated radio resources is registered as a terminal waiting for re-allocation. The terminal 3 that can satisfy the required throughput within the allocated radio resources returns surplus radio resources. The wireless management system totalizes the returned radio resources as the surplus radio resources.

At a point in time when the radio resource allocation is ended, the number of terminals 3 registered as the terminal waiting for re-allocation is confirmed (45). When there is no terminal 3 waiting for re-allocation, radio resource usage amount estimation for all the terminals 3 is completed, and the unallocated radio resources are recorded as the surplus radio resources. When there are one or more terminals 3 waiting for re-allocation, it is determined whether there are surplus radio resources that can be used for re-allocation (46). When there are no surplus radio resources and the allocation of all the radio resources is completed, radio resource usage amount estimation processing is ended. When there are surplus radio resources that can be re-allocated, the surplus radio resources are re-allocated to the terminals 3 waiting for re-allocation (47). The details of a re-allocation procedure of the surplus radio resources will be described with reference to FIG. 7.

Figure 6:
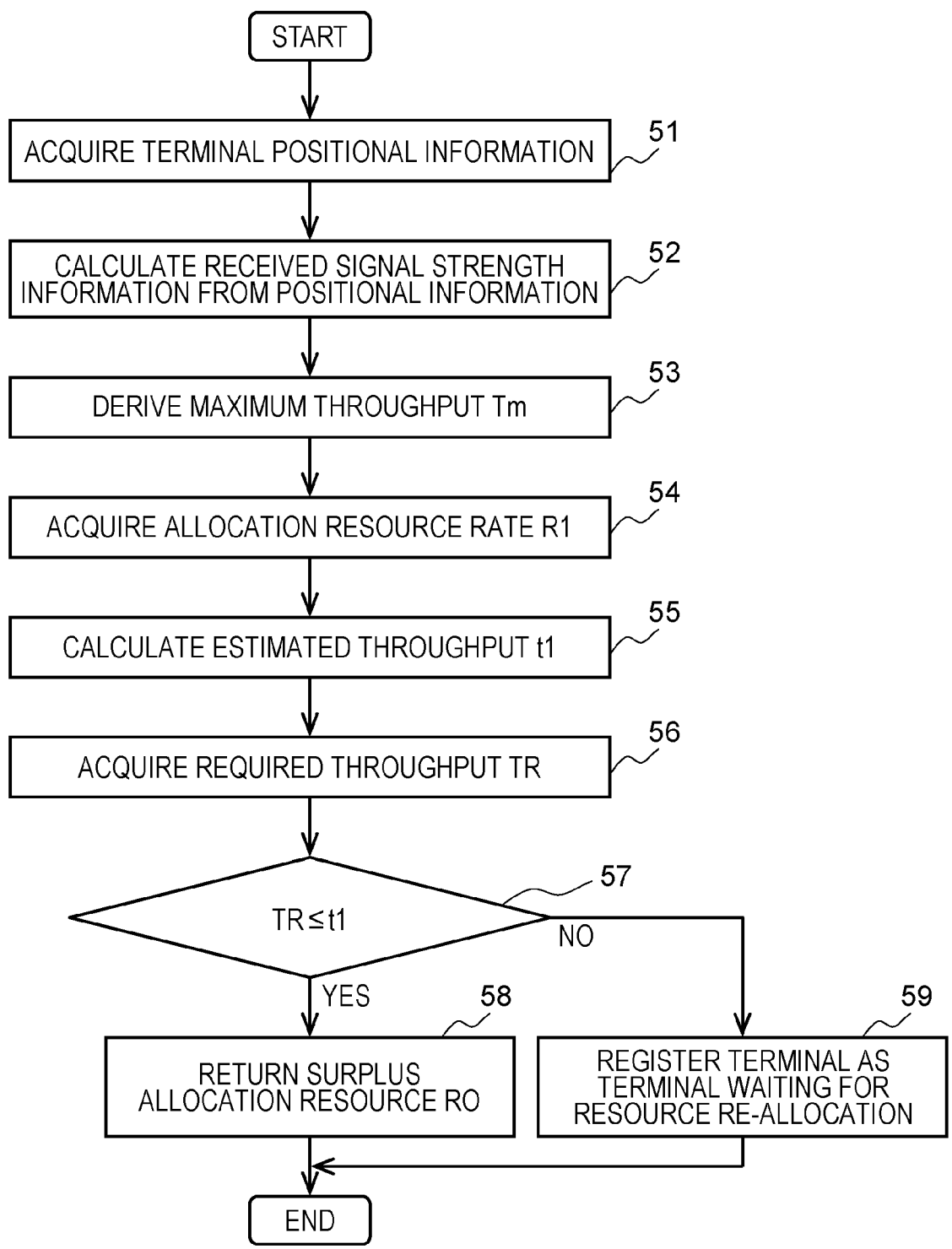
FIG. 6 is a detailed flowchart of an allocation procedure of the first embodiment.

FIG. 6 is a detailed flowchart of the allocation procedure (44).

First, the radio resource calculation unit 15 acquires the positional information of the terminal 3 from the terminal information database 13 (51). As the acquisition of the terminal positional information, the administrator may operate the administrator terminal 4 to input the positional information of the terminal 3, or the positional information measured by the terminal 3 by using a wireless positioning device such as GPS may be acquired by the terminal information collection unit 11. The received signal strength of the terminal 3 is estimated by using the positional information acquired in step 51 and the signal strength distribution in the communication area (52).

Subsequently, maximum throughput Tm of the terminal 3 obtained from the received signal strength estimated in step 52 is derived from the correspondence information between the throughput and the signal strength of the communication environment database 14 (53). The radio resource allocation rate allocated by the wireless management system at this point in time is acquired (54). For example, estimated throughput t1 is calculated as throughput estimated to be obtained next by the terminal 3 when the radio resource allocation rate for the terminal 3 is R1 (55). The estimated throughput can be calculated by the following equation.

$$t1 = R1 \times Tm$$

Subsequently, required throughput TR of the terminal 3 is acquired from the terminal information database 13 (56). The estimated throughput t1 calculated in step 55 is compared with the required throughput TR to determine whether a requirement of the terminal 3 is satisfied (57). When TR≤t1 and the requirement of the terminal 3 is satisfied, the unused radio resources are returned as the surplus radio resources (58). Surplus radio resources RO can be calculated by the following equation.

$$RO = (t1 - TR)/Tm$$

On the other hand, when TR>t1 and the requirement of the terminal 3 is not satisfied, the terminal 3 is registered as the terminal waiting for resource re-allocation (59).

Figure 7:
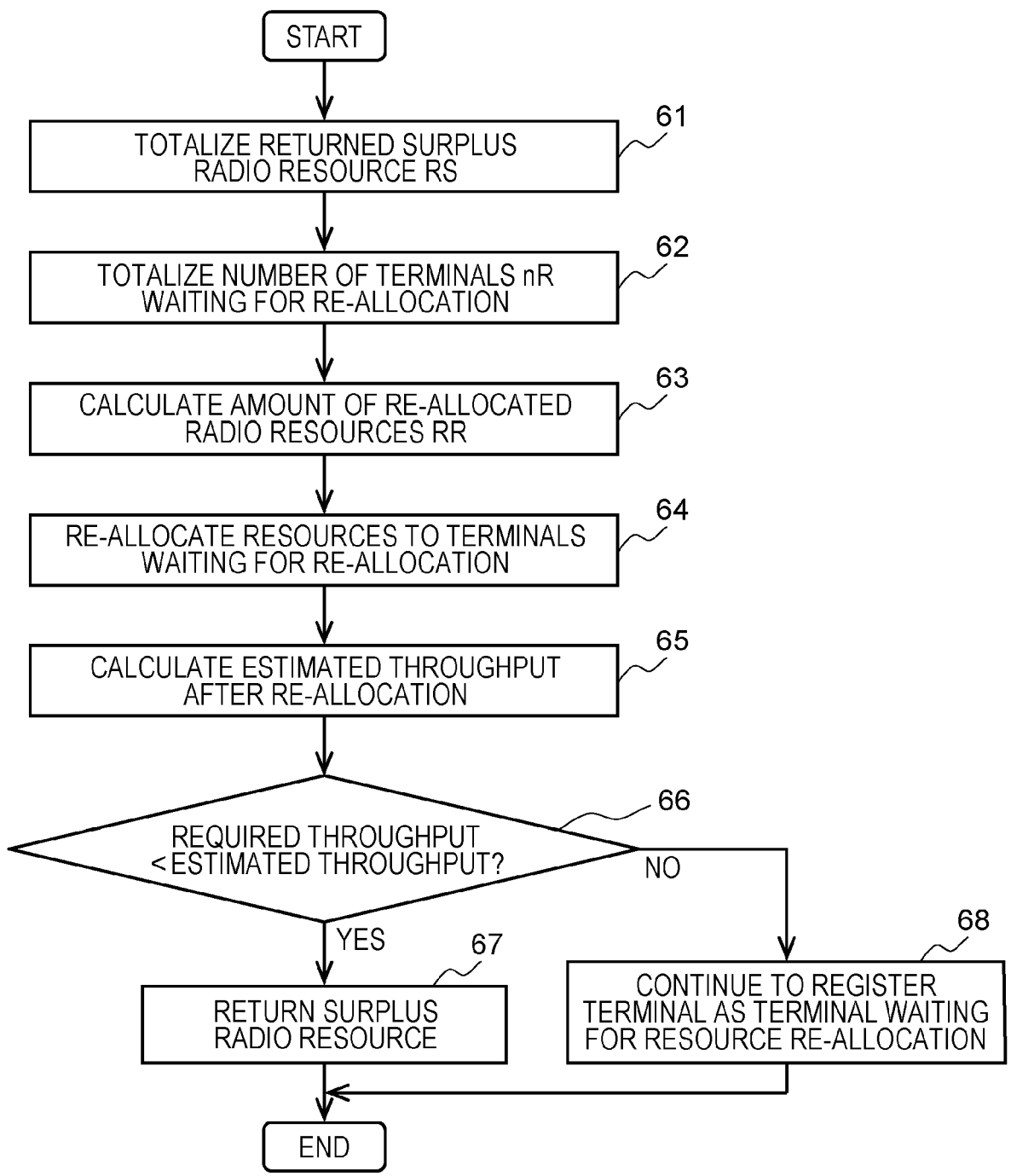
FIG. 7 is a detailed flowchart of a re-allocation procedure of the first embodiment.

FIG. 7 is a detailed flowchart of the re-allocation procedure of the surplus radio resources (47).

First, the radio resource calculation unit 15 totalizes the returned surplus radio resources after the radio resources are allocated to all the target terminals 3, and totalizes the surplus radio resources RS that can be re-allocated (61). Subsequently, the number of terminals nR registered as the terminal waiting for re-allocation is totalized (62). The amount of re-allocated radio resources RR to be re-allocated to the terminals 3 is calculated based on the totalized surplus radio resources RS and the number of terminals nR waiting to be re-allocated (63). RR can be calculated by the following equation.

$$RR = RS/nR$$

The terminal 3 waiting for re-allocation receives the radio resources of the radio resource re-allocation amount and adds the radio resources to an already allocated radio resource allocation amount, and calculates a new radio resource allocation amount and the corresponding estimated throughput (65). The estimated throughput calculated in step 65 is compared with the required throughput to determine whether or not the requirement of the terminal 3 is satisfied (66). When the requirement of the terminal 3 is satisfied, the terminal 3 is deleted from the terminals waiting for resource re-allocation, and an allocation rate for the unused radio resources is returned as the surplus radio resources (67). When the requirement of the terminal 3 is not satisfied even after the re-allocation, the registration of the terminal 3 as the terminal waiting for the resource re-allocation is continued.

A radio resource usage rate of the terminal 3 and a surplus radio resource usage rate at a desired time can be calculated by estimating the aforementioned radio resource usage rate.

Figure 8:
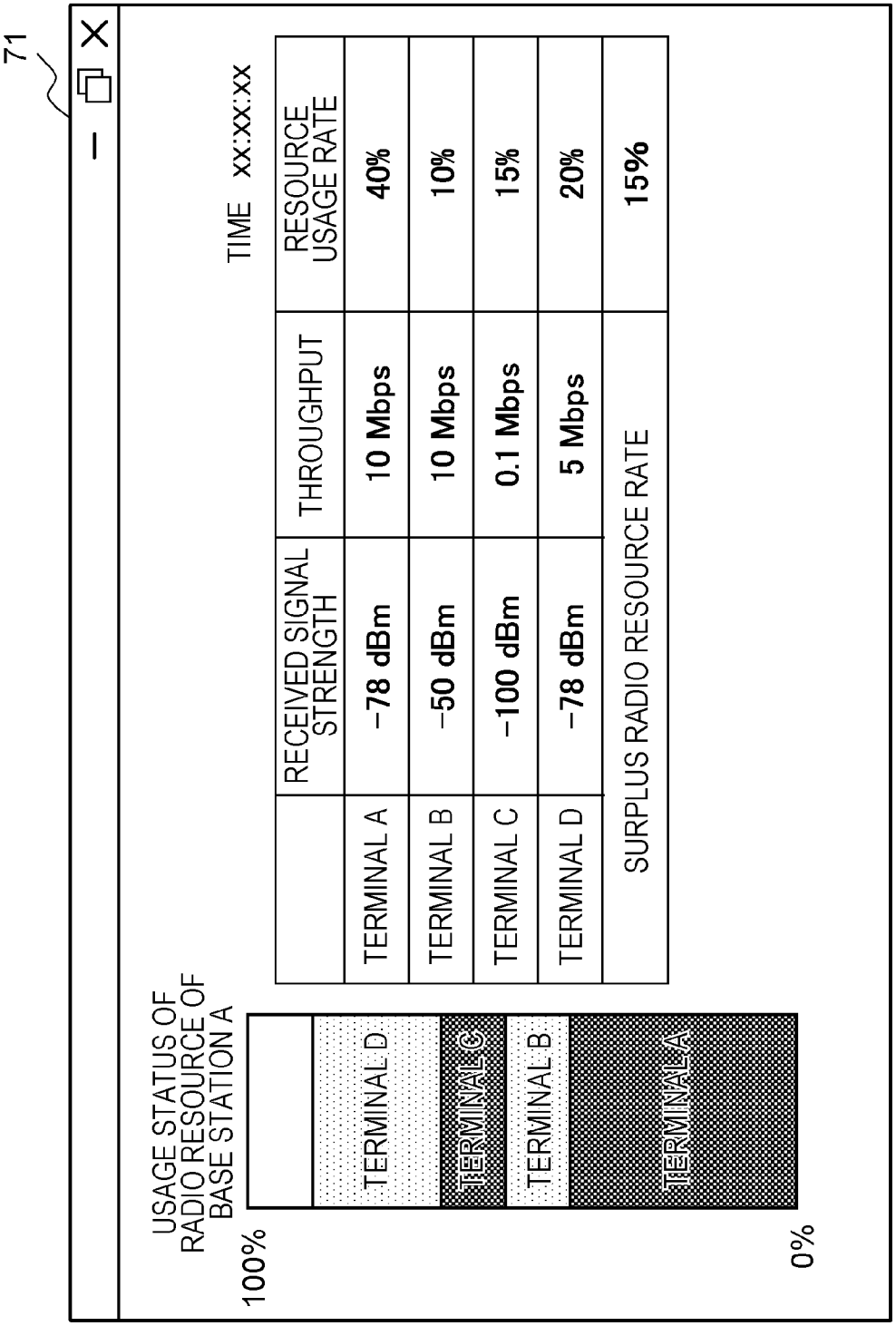
FIG. 8 is a diagram illustrating an example of a screen in which a radio resource usage rate of the first embodiment is displayed on an administrator terminal.
Figure 9:
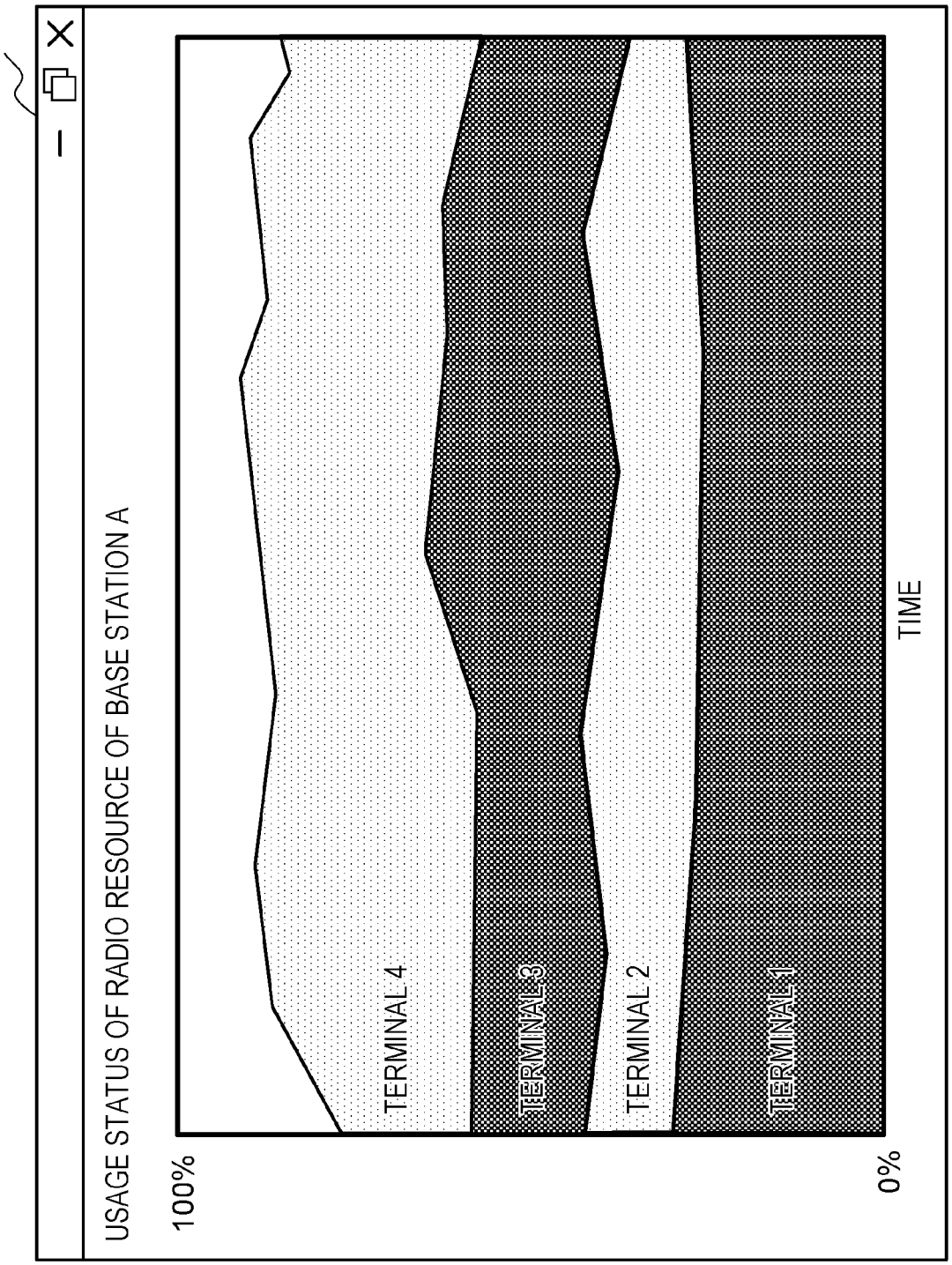
FIG. 9 is a diagram illustrating an example of a screen in which the radio resource usage rate of the first embodiment is displayed on the administrator terminal.

FIGS. 8 and 9 are diagrams illustrating examples of a screen for displaying, on the administrator terminal 4, the radio resource usage rate calculated by the aforementioned method.

The usage status of the terminal 3 and the status of the surplus radio resources in the target base station 2 are visualized, the overall status is illustrated, and the throughput and the resource usage rate of each terminal are displayed. As a result, the administrator can know a resource margin of the entire system and can determine whether or not the terminal 3 can be added or transmission information can be changed. It is possible to know the terminal that uses a large amount of resources and the throughput obtained by each terminal. It is possible to show the tightness of the radio resources at a specific time to the administrator by illustrating the change in the radio resource usage rate in chronological order as illustrated in FIG. 9.

Second Embodiment

In a second embodiment, a method for providing information on an installation location of the terminal 3 from which the throughput is obtained by inputting the required throughput by using a radio resource calculation function of the wireless management system according to the present invention will be described. In the second embodiment, configurations and processing different from the configurations and processing in the first embodiment will be mainly described, and the description of the same configuration and processing as in the first embodiment will be omitted.

Figure 10:
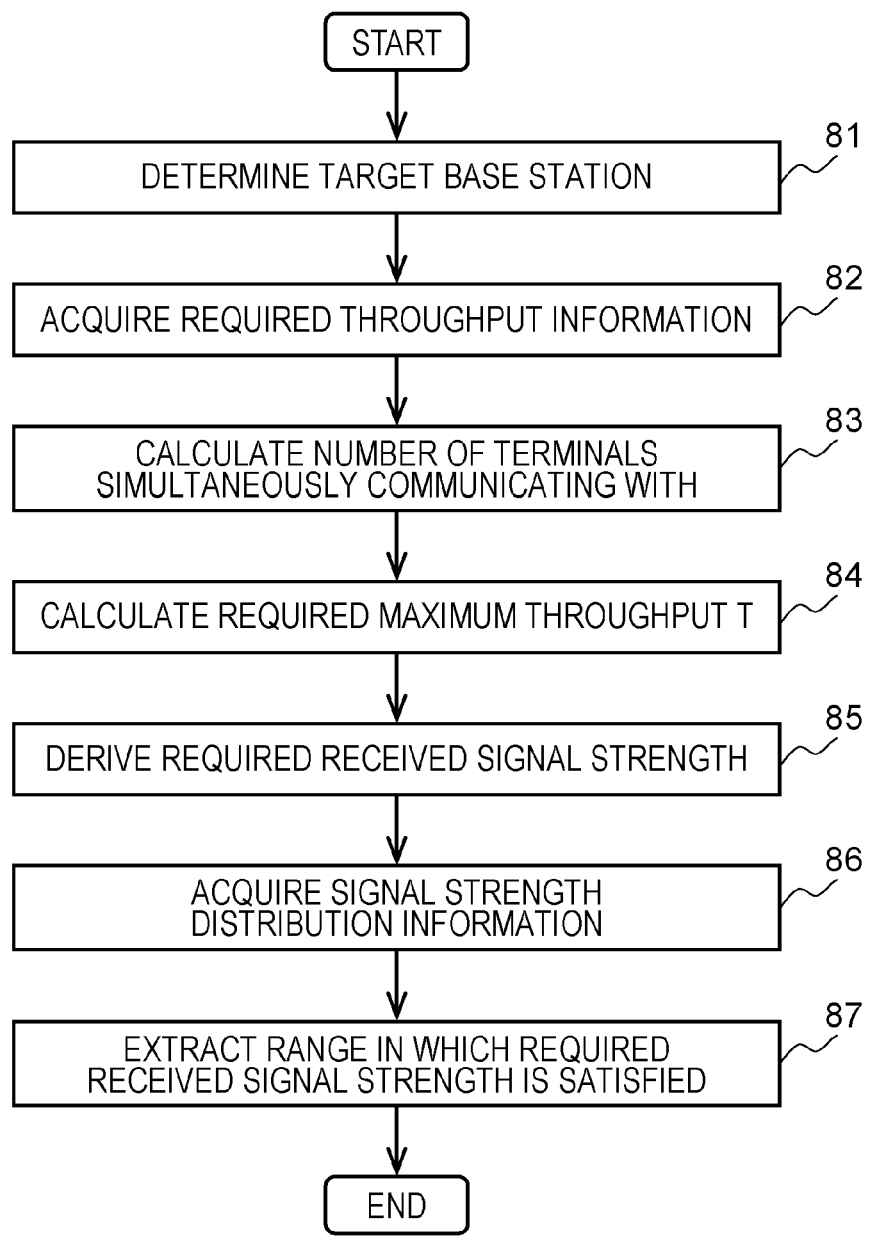
FIG. 10 is a flowchart of processing of extracting a wireless terminal installable location of a second embodiment.

FIG. 10 is a flowchart of processing of extracting installable locations of two wireless terminals.

The extraction of the installable location of the wireless terminals is executed by the radio resource calculation unit 15 of the server 1. First, since the radio resource calculation unit 15 determines an area where the terminal 3 is installed, and the radio resource calculation unit determines the target base station 2 (81). Subsequently, information on throughput required by the terminal 3 and a communication period at the throughput is acquired (82). The information on the throughput and the communication period is input by the administrator operating the administrator terminal 4.

The radio resource calculation unit 15 calculates the maximum number of terminals simultaneously communicating with in a specified period by using these pieces of information (83). For example, the maximum number of terminals simultaneously communicating with is calculated while referring to the communication schedule of the terminal 3. The communication schedules are a communication time, a communication interval, a communication period, and the like of each terminal 3 input by the administrator, and a timing at which the terminal 3 is communicating with is managed by these pieces of information. The wireless management system may estimate the terminal 3 with a high communication possibility at a certain time in the future based on past information by recording a communication time and the amount of communication of the terminal 3 in the past, and may use an estimated value of the number of terminals 3 with the high communication possibility as the number of terminals simultaneously communicating with. The management system may specify devices, such as a machine tool, a sensor, and a camera that are operating at a certain time in the future, to which the terminal 3 is connected, and may use, as the number of terminals simultaneously communicating with, the total number of devices that can perform steady communication among from the specified devices.

Subsequently, required maximum throughput is calculated by using the information on the throughput acquired in step 82 and the maximum number of terminals simultaneously communicating with calculated in step 83 (84). When the maximum number of terminals simultaneously communicating with for the communication period is n (terminals) and the required throughput is t (Mbps), maximum throughput T (Mbps) required to prevent a communication failure in the terminal can be calculated by the following equation.

$$T = n \times t$$

Subsequently, required received signal strength at which this maximum throughput is obtained is calculated from the correspondence information between the throughput and the signal strength of the communication environment database 14 (85).

Subsequently, information indicating the signal strength distribution in the communication area is acquired from the communication environment database 14 (86). For example, received signal strength can be measured at a plurality of locations in the area by a measurement device, and the received signal strength at the unmeasured location can be estimated from the measured value. Alternatively, a distribution status of the received signal strength may be calculated by performing a signal propagation simulation using a three-dimensional model.

A range in which the received signal strength is equal to or greater than the required received signal strength calculated in step 85 is extracted based on the acquired signal strength distribution (87). The extracted range is provided to the administrator through the administrator terminal 4.

The processing of steps 86 and 87 may be executed by the radio resource calculation unit 15 of the server 1, or the required information may be sent to the administrator terminal 4 and the processing may be executed by the administrator terminal 4.

Figure 11:
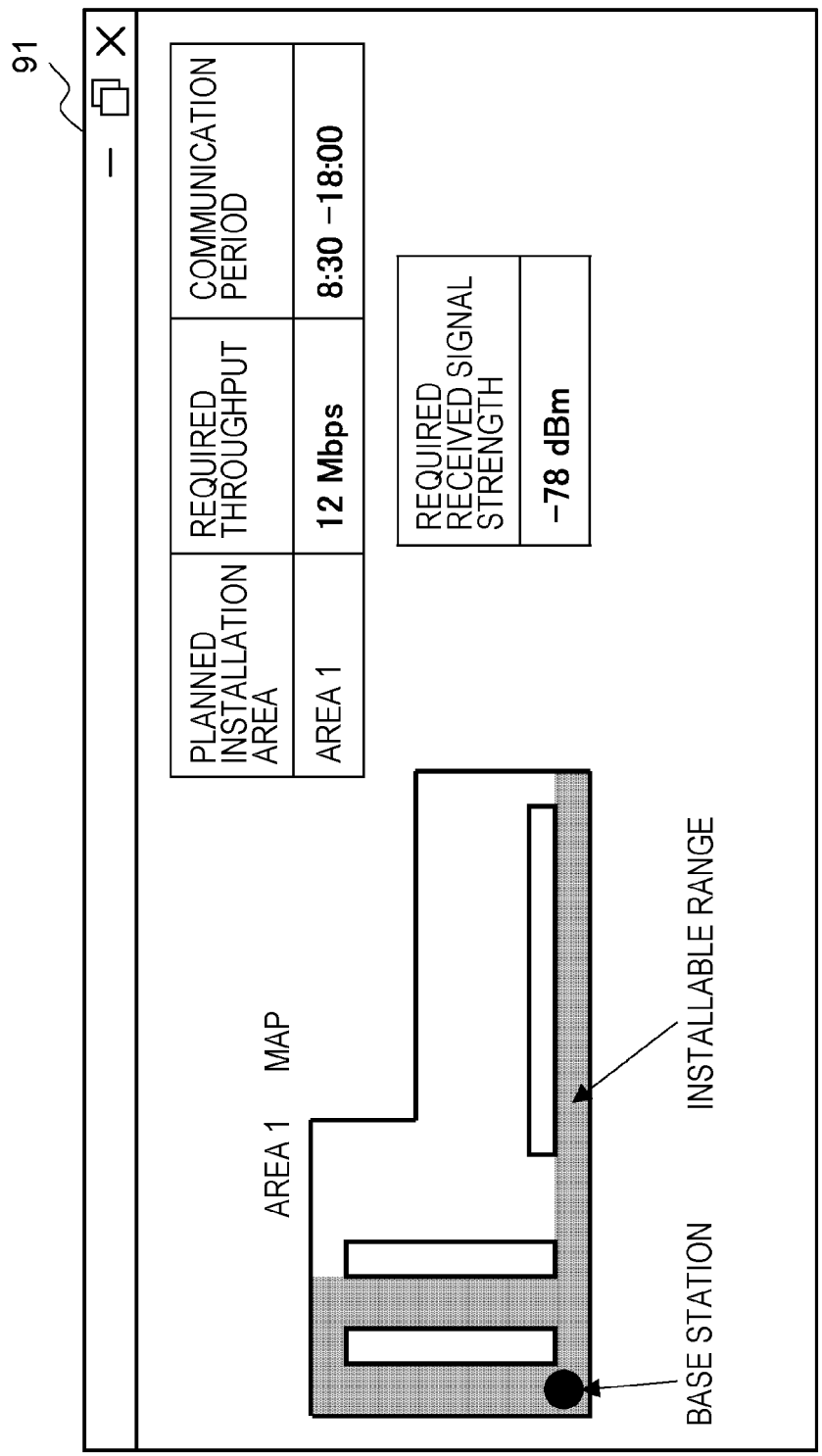
FIG. 11 is a diagram illustrating an example of a screen for displaying the terminal installable location of the second embodiment on the administrator terminal.

FIG. 11 is a diagram illustrating an example of a screen for displaying the terminal installable location on the administrator terminal 4.

In the method of the second embodiment, the terminal installable location for the required throughput is output. The administrator inputs information on a planned installation area, required throughput, and a planned communication period, and displays information on the received signal strength required to satisfy the input required condition and the terminal installable location.

Third Embodiment

In a third embodiment, a method for providing, to the terminal 3, information on guaranteed throughput by inputting the installation location and the communication schedule of the terminal 3 by using the radio resource calculation function by the wireless management system according to the present invention will be described. In the third embodiment, configurations and processing different from the configurations and processing in the first and second embodiments will be mainly described, and the description of the same configuration and processing as in the first and second embodiments will be omitted.

Figure 12:
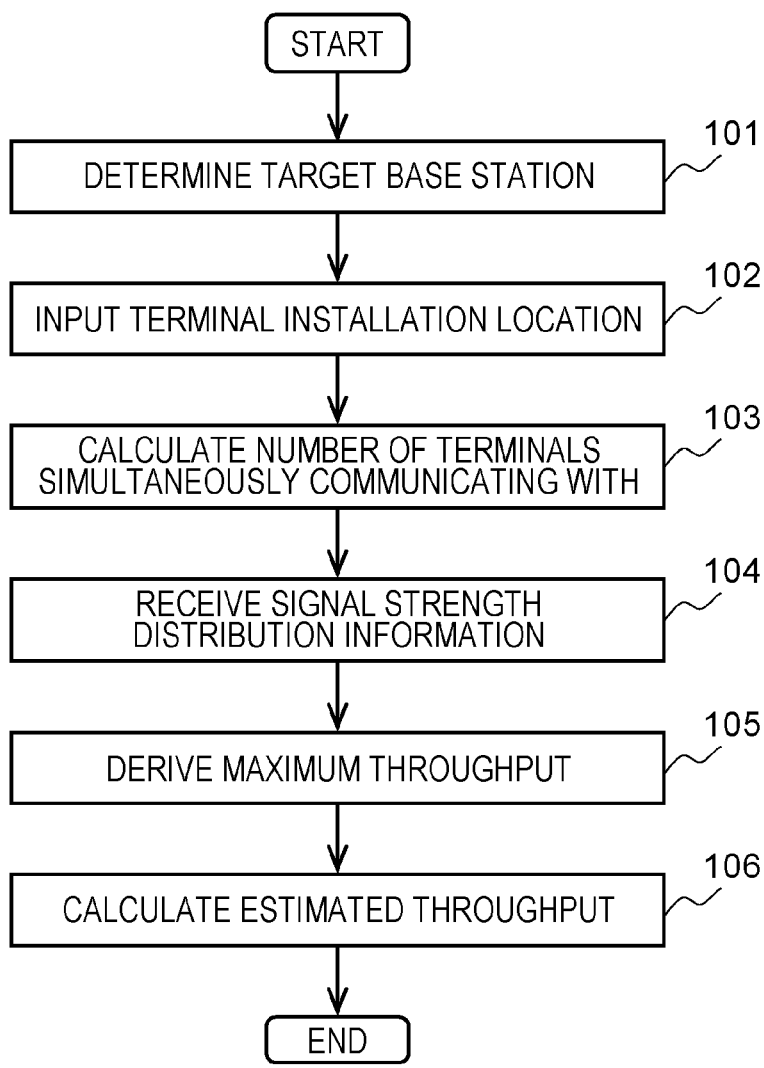
FIG. 12 is a flowchart of processing of calculating throughput of a third embodiment.

FIG. 12 is a flowchart of processing of calculating the throughput based on the installation location and the communication schedule of the terminal 3.

First, the administrator determines the area where the terminal 3 is installed (or the base station 2 that communicates with the terminal 3) from the administrator terminal 4 (101), and inputs a planned installation location of the terminal 3 (102). At this time, a schedule for communication by each terminal 3 is input.

The radio resource calculation unit 15 receives the planned installation location and the communication schedule of the terminal 3, and calculates the maximum number of terminals 3 simultaneously communicating with during the communication period of each terminal 3 (103). For example, the maximum number of terminals simultaneously communicating with is calculated while referring to the communication schedule of the terminal 3. The communication schedules are a communication time, a communication interval, a communication period, and the like of each terminal 3 input by the administrator, and a timing at which the terminal 3 is communicating with is managed by these pieces of information. The wireless management system may estimate the terminal 3 with a high communication possibility at a certain time in the future based on past information by recording a communication time and the amount of communication of the terminal 3 in the past, and may use an estimated value of the number of terminals 3 with the high communication possibility as the number of terminals simultaneously communicating with. The management system may specify devices, such as a machine tool, a sensor, and a camera that are operating at a certain time in the future, to which the terminal 3 is connected, and may use, as the number of terminals simultaneously communicating with, the total number of devices that can perform steady communication among from the specified devices.

Subsequently, the radio resource calculation unit 15 acquires the information indicating the signal strength distribution in the communication area from the communication environment database 14 (104). The received signal strength obtained by the terminal 3 at the input location is calculated based on the acquired signal strength distribution. The radio resource calculation unit 15 calculates the maximum throughput obtained by each terminal 3 from the calculated received signal strength and the correspondence information between the throughput and the signal strength of the communication environment database 14 (105).

The radio resource calculation unit 15 calculates the estimated throughput of the terminal from the calculated maximum throughput and the maximum number of terminals simultaneously communicating with the terminal 3 during the communication period (106). When the maximum throughput is T and the maximum number of terminals simultaneously communicating with is n, the estimated throughput t can be calculated by the following equation.

$$t=T/n$$

Figure 13:
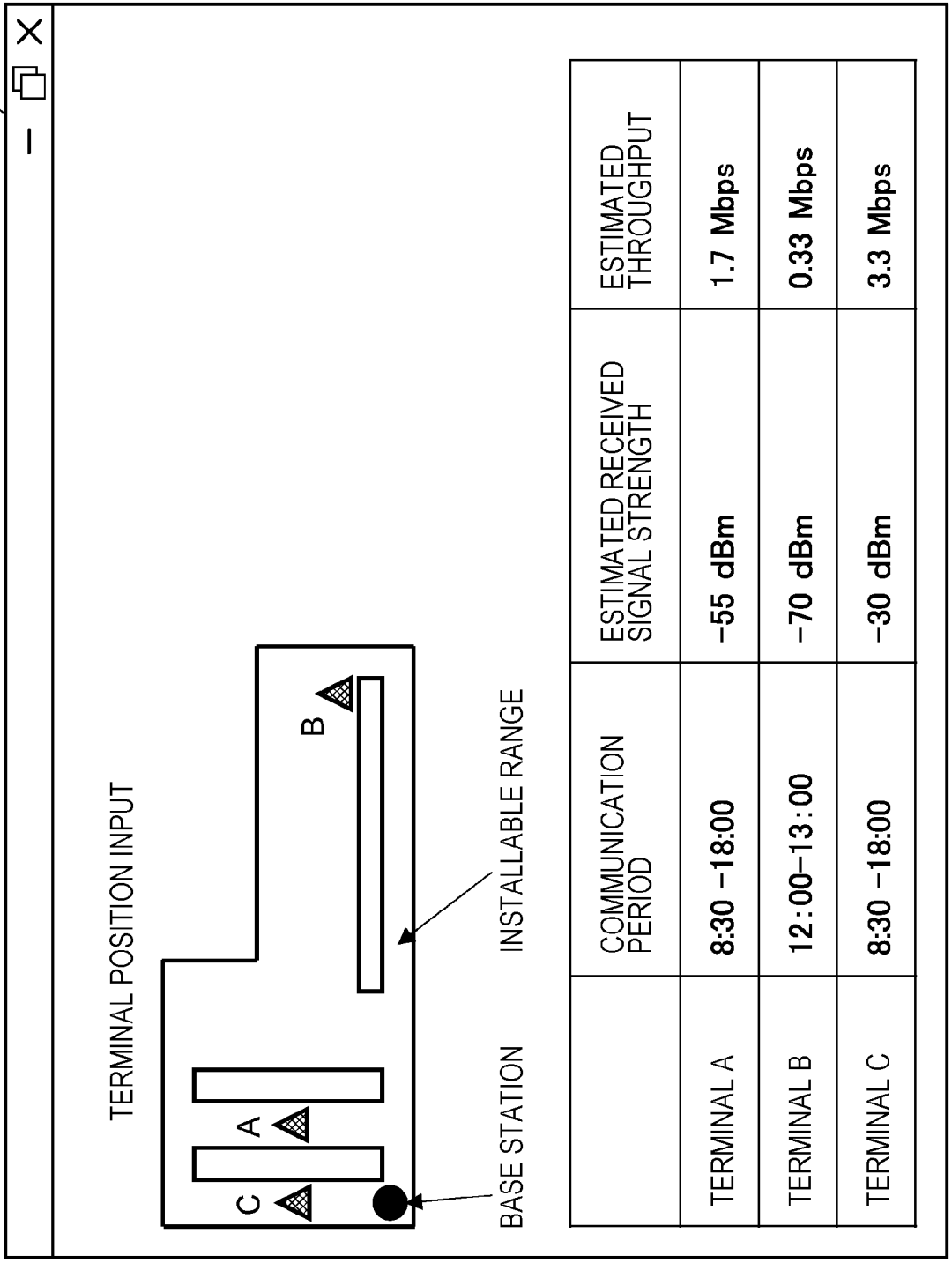
FIG. 13 is a diagram illustrating an example of a screen for displaying information on the throughput of the third embodiment on the administrator terminal.

FIG. 13 is a diagram illustrating an example of a screen for displaying the information on the throughput on the administrator terminal 4.

In the method of the third embodiment, information on the estimated throughput of the terminal 3 is provided by inputting information on the planned terminal installation location and the communication schedule. The administrator displays the information on the estimated throughput and the information on the estimated received signal strength when the allocation of the radio resources to each terminal 3 is the smallest and the throughput is small by designating the planned installation location of the terminal 3 on a map and inputting the communication period of each terminal 3.

As described above, the wireless management system according to the present embodiment calculates the usage rate of the radio resources used by the terminal 3 based on the positional information of the terminal 3 and the number of terminals 3 communicating with the base station 2 at the time of communication between the terminals 3 and the base station 2, actual resource allocation can be accurately simulated with a small amount of information that can be easily collected, and a margin of the radio resources can be accurately presented.

Since the wireless management system according to the present embodiment calculates the number of terminals 3 communicating with the base station 2 at the time of communication between the terminals 3 and the base station 2 based on the communication schedule registered by the administrator, the resource allocation can be accurately simulated when the communication schedule is known.

Since the wireless management system according to the present embodiment calculates the number of terminals 3 communicating with the base station 2 at the time of communication between the terminals 3 and the base station 2 based on past communication records, the administrator can accurately simulate the resource allocation by using the information retained by the wireless management system without times and effort.

In the wireless management system according to the present embodiment, since the number of terminals 3 communicating with the base station 2 at the time of communication between the terminals 3 and the base station 2 among the terminals 3 connected to the base station 2 is calculated based on the number of terminals 3 having a possibility that the device connected to the terminal 3 is operating and is communicating with through the terminal 3, the resource allocation can be accurately simulated when the communication schedule (for example, an operating time of a machine installed in a factory) is known.

Since the wireless management system according to the present embodiment estimates the received signal strength of the terminal 3 by using the positional information of the terminal 3 and the signal strength distribution in the communication area, derives the maximum throughput of the terminal 3 obtained by the estimated received signal strength, acquires the radio resource allocation rate for the terminal 3, and calculates the estimated throughput of the terminal 3 by multiplying the calculated maximum throughput by the acquired radio resource allocation rate, the actual resource allocation can be accurately simulated with a small amount of information such as the positions and the number of terminals 3.

In the wireless management system according to the present embodiment, when the estimated throughput by the radio resources allocated to the terminal 3 exceeds the required throughput, since the surplus radio resources are reduced, the radio resources are allocated, and the surplus radio resources are allocated to the other terminal 3, the actual resource allocation can be accurately simulated.

Since the wireless management system according to the present embodiment generates data for displaying the status of the radio resources in the base station 2 based on the calculated usage rate of the radio resources, a margin of the radio resources at a specific point in time can be presented.

Since the wireless management system according to the present embodiment generates data for displaying the installable range of the terminal 3 that can provide the throughput required by the terminal 3 based on the calculated usage rate of the radio resources, the installable location by the input of the purpose of the terminal 3 can be presented to the administrator.

Since the wireless management system according to the present embodiment generates data for displaying the estimated throughput when the terminal 3 is placed at the specified position based on the calculated usage rate of the radio resources, the obtained maximum throughput can be presented by inputting the installation position of the terminal 3.

The present invention is not limited to the aforementioned embodiments, and includes various modification examples and equivalent configurations within the gist of the appended claims. For example, the aforementioned embodiment is described in detail in order to facilitate easy understanding of the present invention, and the present invention is not limited to necessarily including all the described components. A part of the configuration of one embodiment may be replaced with the configuration of another embodiment. The configuration of another embodiment may be added to the configuration of one embodiment. Another configuration may be added, removed, and substituted to, from, and for some of the configurations of the aforementioned embodiments.

A part or all of the aforementioned configurations, functions, processing units, and processing means may be realized by hardware by being designed with, for example, an integrated circuit. Alternatively, the processor interprets and executes a program for realizing the functions, and thus, a part or all of the aforementioned configurations, functions, processing units, and processing means may be realized by software.

Information of programs, tables, and files for realizing the functions can be stored in a storage device such as a memory, a hard disk, or a solid state drive (SSD), or a recording medium such as an IC card, an SD card, or a DVD.

Control lines and information lines illustrate lines which are considered to be necessary for the description, and not all the control lines and information lines necessary in the implementation are necessarily illustrated. Almost all the configurations may be considered to be actually connected to each other.

What is claimed is:

1. A wireless management system that manages a wireless system including a base station and terminals, the wireless management system comprising:
    a computer that includes an arithmetic device that executes predetermined arithmetic processing, and a storage device connected to the arithmetic device, wherein
    the arithmetic device calculates a usage rate of radio resources used by the terminal based on positional information of the terminals and the number of terminals communicating with the base station at the time of communication between the terminals and the base station,
    the arithmetic device estimates received signal strength of the terminal by using the positional information of the terminal and a signal strength distribution in a communication area,
    the arithmetic device derives maximum throughput of the terminal obtained by the estimated received signal strength,
    the arithmetic device acquires a radio resource allocation rate for the terminal, and
    the arithmetic device calculates estimated throughput of the terminal by multiplying the calculated maximum throughput by the acquired radio resource allocation rate.

2. The wireless management system according to claim 1, wherein the arithmetic device calculates the number of terminals communicating with the base station at the time of communication between the terminals and the base station based on a communication schedule registered by an administrator.

3. The wireless management system according to claim 1, wherein the arithmetic device calculates the number of terminals communicating with the base station at the time of communication between the terminals and the base station based on a past communication record.

4. The wireless management system according to claim 1, wherein the arithmetic device calculates the number of terminals communicating with the base station at the time of communication between the terminals and the base station based on the number of terminals having a possibility that a device connected to the terminal is operating and communicates with through the terminal among the terminals connected to the base station.

5. The wireless management system according to claim 1, wherein the arithmetic device reduces surplus radio resources and allocates radio resources when the estimated throughput by the radio resources allocated to the terminal exceeds required throughput, and
    the arithmetic device allocates the surplus radio resources to another terminal.

6. The wireless management system according to claim 1, wherein
    the arithmetic device generates data for displaying a status of radio resources in the base station based on the calculated usage rate of the radio resources.

7. The wireless management system according to claim 1, wherein
    the arithmetic device generates data for displaying an installable range of the terminal that is able to provide throughput required by the terminal based on the calculated usage rate of the radio resources.

8. The wireless management system according to claim 1, wherein
    the arithmetic device generates data for displaying throughput estimated when the terminal is placed at a designated position based on the calculated usage rate of the radio resources.

9. A wireless management method executed by a wireless management system that manages a wireless system including a base station and terminals, the wireless management system including a computer that includes an arithmetic device that executes predetermined arithmetic processing and a storage device connected to the arithmetic device, the wireless management method comprising:
    acquiring, by the arithmetic device, positional information of the terminals, and the number of terminals communicating with the base station at the time of communication between the terminals and the base station; and
    calculating, by the arithmetic device, a usage rate of radio resources used by the terminal based on the acquired positional information of the terminals and the acquired number of terminals,
    estimating, by the arithmetic device, received signal strength of the terminal by using the positional information of the terminal and a signal strength distribution in a communication area,
    deriving, by the arithmetic device, maximum throughput of the terminal obtained by the estimated received signal strength,
    acquiring, by the arithmetic device, a radio resource allocation rate for the terminal, and
    calculating, by the arithmetic device, estimated throughput of the terminal by multiplying the calculated maximum throughput by the acquired radio resource allocation rate.

* * * * *